Aug. 31, 1937.  F. M. STADLER  2,091,379
SAFETY VALVE
Filed Aug. 17, 1936  2 Sheets-Sheet 1

Inventor
Fred M. Stadler,

By Clarence A. O'Brien
Hyman Berman
Attorneys

Aug. 31, 1937.   F. M. STADLER   2,091,379
SAFETY VALVE
Filed Aug. 17, 1936   2 Sheets-Sheet 2

Inventor
Fred M. Stadler.

By Clarence A. O'Brien
Hyman Berman
Attorneys

Patented Aug. 31, 1937

2,091,379

UNITED STATES PATENT OFFICE 2,091,379

SAFETY VALVE

Fred M. Stadler, Hondo, Calif.

Application August 17, 1936, Serial No. 96,533

1 Claim. (Cl. 137—153)

This invention appertains to new and useful improvements in safety valve for gas lines. An important object of the invention is to provide a safety valve for installation between the usual gas meter and a consumers line so that in the event the gas supply fails for a period of time and the gas burning fixtures of the consumer become extinguished, the valve will close and remain closed until some person having access to the valve manually opens the same.

The present invention is an improvement on my pending application Serial No. 48,394, filed November 5, 1935.

Various other important objects and advantages of the invention will become apparent to the reader of the following specification.

In the drawings:—

Figure 1:
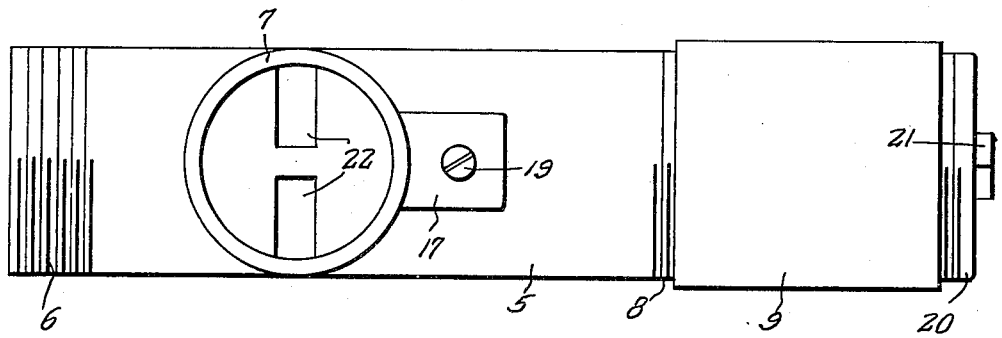
Figure 1 represents a top plan view of the safety valve.
Figure 2:
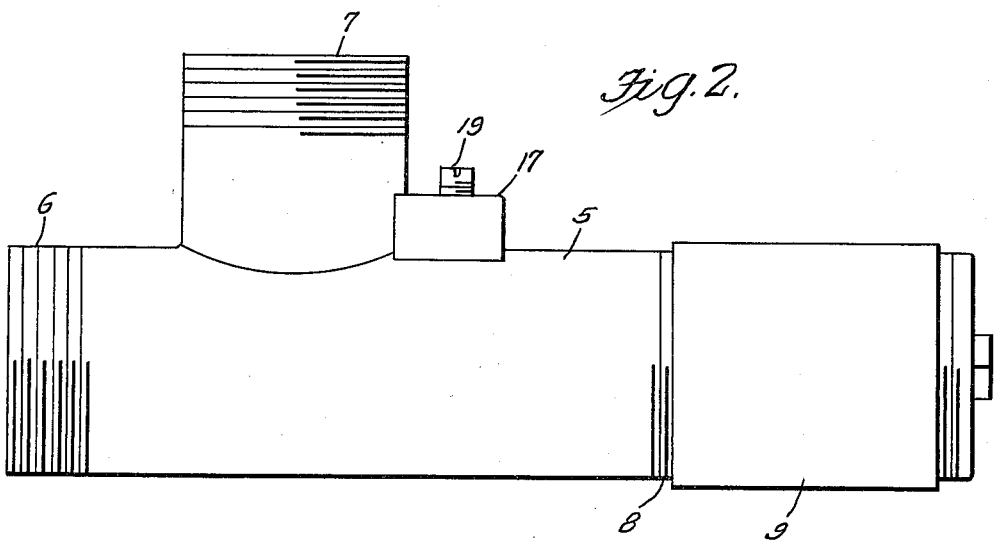
Figure 2 represents a side elevational view of the assembly.
Figure 7:
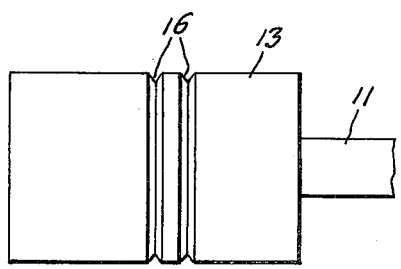
Figure 7 is a fragmentary side elevational view showing the plunger.

Referring to the drawings wherein like numerals designate like parts, it can be seen that the valve assembly consists of the T fitting 5 including the threaded end portion 6, 7 and 8. An internally threaded sleeve 9 engages over the threaded end 8 and this sleeve has a partition 10 therein through which the piston rod 11 is slidable. A coiled compressible spring 12 is provided on the piston rod 11 between the partition 10 and the piston 13 to which the rod 11 is secured. The piston 13 is provided with the pocket 14 in its forward end and the pocket 15 in its rearward end, while the intermediate portion of the piston is provided with circumferentially extending oil grooves 16.

A thickened formation 17 on the fitting 5 has an oil reservoir 18 therein and this reservoir is internally threaded to receive the threaded plug 19. The piston is operative back and forth under the discharge opening of this reservoir 18, the grooves 16 always being filled with lubricant.

The remaining end of the sleeve 9 is provided with a threaded plug 20 provided with a polygonal wrench engaging extension 21.

The horizontal portion of the fitting 5 defines a cylinder for the piston 13 which has slots 22 in the upper portion thereof connecting the interior of the lower portion of the fitting with the end portion 7. Piston 13 is operative across the opening 22 to close the same from the gas supply inlet end 6. Within the gas inlet end 6 is the screen 23 which is clamped in position by the spring ring 24 against the bosses 25 on the inside of the piston cylinder.

Figure 3:
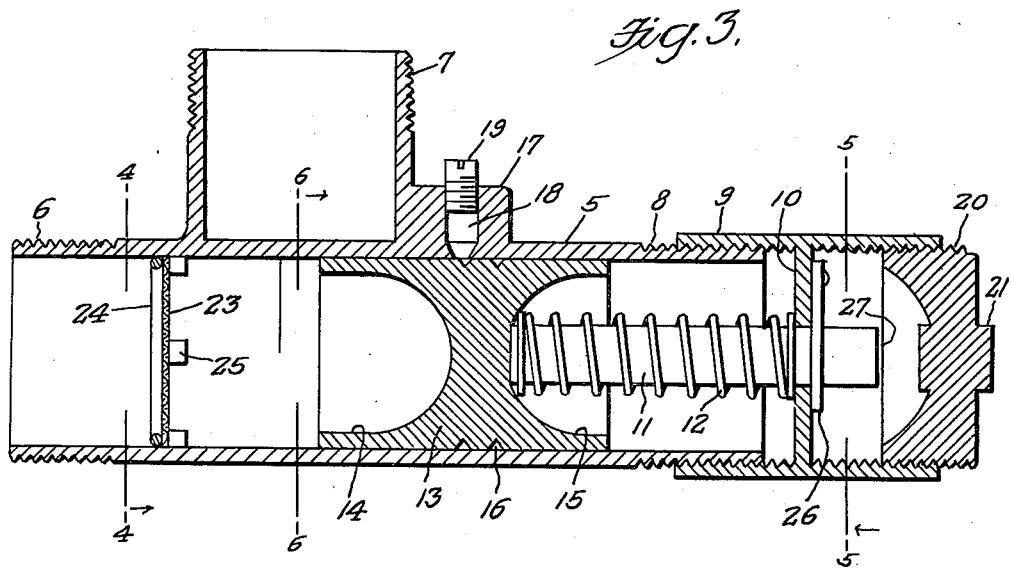
Figure 3 is a longitudinal sectional view through the valve assembly.
Figure 4:
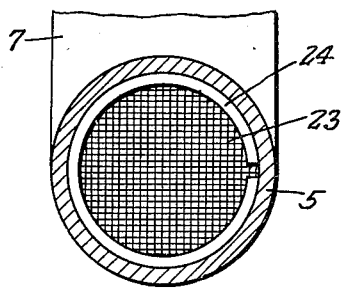
Figure 4 is a section on line 4—4 of Figure 3.
Figure 5:
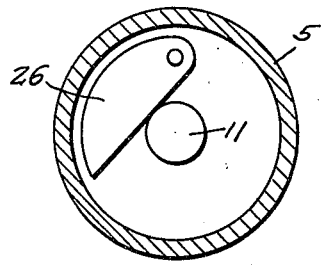
Figure 5 is a cross-sectional line on 5—5 of Figure 3.
Figure 6:
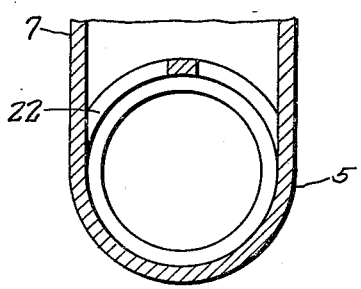
Figure 6 is a cross-sectional view on line 6—6 of Figure 3.

It can be now be seen, that as long as there is a gas pressure against the piston 13, the piston will be retained in the position as shown in Figure 3 so that the gas can pass out through the slot 22 to the consumer's line attached to the end 7 of the fitting. However, in the event the pressure of this gas fails, the spring 12 will urge the piston 13 to the left in Figure 1 until the piston closes the slot 22 and the pivotal catch 26 swings down behind the end 27 of the piston rod. In this manner, even though the gas again flows under normal pressure, the openings 22 will remain closed until the plug 20 is removed and the latch 26 removed from the end of the rod 11.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed is:—

A safety valve for a pressure line comprising a cylinder communicating with the line and having a lateral extension, a piston operative in the cylinder, a rod extending from the piston, one end of the cylinder being threaded, an internally threaded sleeve engaged at one end over the threaded end of the cylinder, a partition in the sleeve having an opening for slidably receiving the rod, a latch pivoted to the partition in the sleeve for engaging the free end of the piston rod, spring means interposed between the piston and the partition for actuating the piston to close communication between the line and the extension upon a failure of pressure in the line and a removable plug in the outer end of the sleeve enclosing said latch, said piston being provided with a circumferentially extending oil groove and an oil reservoir on the cylinder having an outlet opening against the said piston.

FRED M. STADLER.